United States Patent
Carberry et al.

(10) Patent No.: US 9,091,510 B2
(45) Date of Patent: Jul. 28, 2015

(54) TRANSPARENT ARMOR SYSTEM AND METHOD OF MANUFACTURE

(75) Inventors: John Carberry, Talbott, TN (US); George D. Forsythe, Landenberg, PA (US); Katherine T. Leighton, Media, PA (US)

(73) Assignee: Schott Corporation, Elmsford, NY (US)

( * ) Notice: Subject to any disclaimer, the term of this patent is extended or adjusted under 35 U.S.C. 154(b) by 693 days.

(21) Appl. No.: 11/689,299

(22) Filed: Mar. 21, 2007

(65) Prior Publication Data

US 2013/0312593 A1    Nov. 28, 2013

(51) Int. Cl.
*F41H 5/04* (2006.01)
*B32B 17/10* (2006.01)

(52) U.S. Cl.
CPC ........ *F41H 5/0407* (2013.01); *B32B 17/10036* (2013.01); *B32B 17/10045* (2013.01); *B32B 17/1077* (2013.01); *B32B 17/10119* (2013.01); *B32B 17/10761* (2013.01); *F41H 5/0414* (2013.01); *F41H 5/0428* (2013.01)

(58) Field of Classification Search
CPC ........... B32B 17/10036; B32B 17/10045; B32B 17/10761; B32B 17/1077; B32B 17/10119; F41H 5/0407; F41H 5/0414
USPC ............. 428/911, 417, 912, 411.1, 426–442, 428/412; 89/36.01, 36.02, 36.04; 501/3–7; 65/33.8

See application file for complete search history.

(56) References Cited

U.S. PATENT DOCUMENTS

| 3,917,891 | A |   | 11/1975 | Cooke et al. |   |
|---|---|---|---|---|---|
| 4,869,175 | A |   | 9/1989 | McDougal |   |
| 5,060,553 | A | * | 10/1991 | Jones | 89/36.02 |
| 5,502,011 | A |   | 3/1996 | Yamamoto et al. |   |
| H1567 | H | * | 8/1996 | Parsons et al. | 89/36.02 |
| 5,567,529 | A | * | 10/1996 | Smith | 428/425.6 |
| 5,773,139 | A |   | 6/1998 | Ogura et al. |   |

(Continued)

FOREIGN PATENT DOCUMENTS

| FR | 2876786 A1 | 4/2006 |
|---|---|---|
| GB | 2 284 655 | 6/1995 |

(Continued)

OTHER PUBLICATIONS

Burge et al. "Thermal Expansion of Borosilicate Glass, Zerodur, Zerodur M, and Unceramized Zerodur at Low Temperatures". Applied Optics, vol. 38, Issue 34, pp. 7161-7162 (1999).*

(Continued)

*Primary Examiner* — Prashant J Khatri
(74) *Attorney, Agent, or Firm* — Ohlandt, Greeley, Ruggiero & Perle, LLP

(57) ABSTRACT

A transparent armor system includes a hard face fabricated from a substantially transparent glass-ceramic material exhibiting crystalline bodies throughout the mass of the glass-ceramic material and a backing covering a rear surface of the hard face opposite an anticipated incoming projectile. The backing has a refractive index substantially matching that of the hard face such as to allow substantial transparency of the transparent armor system. In certain embodiments, a bonding layer is provided to bond the backing to the hard face. The hard face serves to disburse energy caused by the impact of an incoming projectile with the transparent armor system, while the backing serves to retain any pieces of the hard face fractured during ballistic impact.

14 Claims, 9 Drawing Sheets

(56) References Cited

U.S. PATENT DOCUMENTS

| | | | |
|---|---|---|---|
| 5,783,297 | A | 7/1998 | Wise et al. |
| 5,952,253 | A | 9/1999 | Dejneka et al. |
| 6,334,482 | B2 | 1/2002 | Berglund et al. |
| 6,479,155 | B1 | 11/2002 | Gelderie et al. |
| 6,862,970 | B2 | 3/2005 | Aghajanian et al. |
| 6,895,851 | B1 | 5/2005 | Adams et al. |
| 6,995,103 | B2 | 2/2006 | Aghajanian |
| 7,104,177 | B1 | 9/2006 | Aghajanian et al. |
| 7,875,565 | B1* | 1/2011 | Pinckney et al. ............ 501/4 |
| 8,161,862 | B1* | 4/2012 | Pinckney et al. ............ 89/36.02 |
| 2002/0183187 | A1* | 12/2002 | Siebers et al. ............ 501/4 |
| 2004/0157720 | A1* | 8/2004 | Sakamoto et al. ............ 501/4 |
| 2005/0119104 | A1* | 6/2005 | Alexander et al. ............ 501/14 |
| 2005/0135724 | A1 | 6/2005 | Helvajian et al. |
| 2006/0160689 | A1* | 7/2006 | Hsu et al. ............ 501/7 |

FOREIGN PATENT DOCUMENTS

| | | |
|---|---|---|
| WO | WO03/022767 | 3/2003 |
| WO | WO2006/135832 | 12/2006 |
| WO | 2007068376 A1 | 6/2007 |
| WO | 2009000891 A2 | 12/2008 |

OTHER PUBLICATIONS

European Search Report dated Feb. 26, 2013 for European application No. 08826142.5.
European Search Report dated Feb. 26, 2013 for European application No. 10010265.6.
Israeli Office Action dated Jan. 24, 2013 for Israeli application No. 201060.
Israeli Office Action dated Jan. 24, 2013 for Israeli application No. 201061.
Israeli Office Action dated Jan. 24, 2013 for Israeli application No. 213994.
Israel Office Action dated Mar. 18, 2014 for Israel application No. 201060.
Israel Office Action dated Mar. 27, 2014 for Israel application No. 213994.

* cited by examiner

TRANSPARENT ARMOR SYSTEM AND METHOD OF MANUFACTURE

CROSS-REFERENCE TO RELATED APPLICATIONS

Not Applicable

STATEMENT REGARDING FEDERALLY-SPONSORED RESEARCH OR DEVELOPMENT

Not Applicable

BACKGROUND OF THE INVENTION

1. Field of Invention

This invention relates to ballistic armor. More specifically, this invention relates to a transparent armor system utilizing a glass-ceramic hard face which provides comparable protection in a ballistic armor structure weighing less than traditional transparent armor that is in most commercial use, and is less expensive to manufacture than transparent systems of similar weight.

2. Description of the Related Art

In order to provide protection of personnel and equipment from ballistic projectiles, explosive ordnance, and forces and objects from detonation of improvised explosive devices (collectively hereinafter "projectiles"), it is necessary to provide a means of disbursing the kinetic energy of such projectiles to prevent them from reaching their target. Although this may be accomplished by interposing a large mass of any of a number of different materials between the target and the incoming projectile, experience has shown that a much more efficient means of energy disbursement is provided by suitably engineered ballistic armor structures wherein layers of different materials act to disrupt an incoming projectile. Such a structure strives to maximize the amount of material which may be acted upon to absorb and disburse the energy of the projectile, while at the same time breaking or deforming the projectile and distributing these resulting fragments into a wider area. Such a structure further strives to minimize the total amount of materials required for the protection of a specific area.

Ballistic armor structures generally contain one or more layers of material engineered to spread the force of the impact by deforming, deflecting, or fragmenting the ballistic projectile while the ballistic armor itself undergoes deformation or localized fragmentation. The deformation and localized fragmentation processes of the ballistic armor structure absorb a large portion of energy from the projectile while simultaneously spreading the impacted area to involve more material in successive layers. Both hardness and toughness of the ballistic armor structure are required for these functions.

In the field of ballistic armor structures, the initial layer of material used to disrupt the incoming ballistic projectile is often referred to as the "strike face," or alternatively, the "hard face." The hard face is typically a layer of relatively hard and tough material designed to deform, and in some cases fragment, to absorb at least some of the energy of the incoming projectile, thereby distributing the projectile's energy. Following the hard face are other layers specifically designed to absorb the remaining energy of the impacting material and pieces of the previous hard face. These layers are often referred to as the "backing" or "catcher."

The process of energy absorption and disbursement of the incoming projectile by the ballistic armor structure is generally intended to result in deformation, displacement and/or localized fracture of the hard face, and deformation and/or displacement of the backing, but without penetration through the ballistic armor structure by any fragments of the ballistic projectile. Selection of materials for these distinct functions and careful attention to construction and coupling of the various layers is essential to optimizing performance of the ballistic armor structure.

Great advances have been made in selection of materials for optimizing the performance of ballistic armor structures. Use of high-strength, hard, and in some cases "tough" ceramics like aluminum oxide, boron carbide, titanium diboride and silicon carbide for the hard face; and rigid or soft laminates of fibrous materials such as fiberglass, aramid, or polyethylene fiber for the backing have greatly reduced the mass and bulk of protective structures. These advances, unfortunately, have not been readily applicable to those areas where a transparent protective structure is required. Neither the high-strength, hard ceramics nor the laminated fibrous backing materials are typically transparent, and so neither are adaptable to transparent protective structures.

The need for transparency severely limits possible choices of materials for fabrication of the hard face of transparent protective systems. Although recent advances have been demonstrated in use of hot-pressed spinel or aluminum oxynitride (ALON) ceramics, or melt grown aluminum oxide (sapphire) crystal sheets for the hard face, manufacturing cost and size limitations would seem to restrict their use in all but the most critical of situations. The standard material used for fabrication of the hard face in transparent structures is borosilicate float glass or soda lime glass, a material which is neither very hard, nor very tough, and which has a relatively high specific density. This results in the need to greatly increase the aerial mass and bulk of transparent armors in order to preserve effectiveness. Such increase in aerial mass and bulk ultimately results in a conventional transparent armor having an increased weight per level of protection provided by the transparent armor.

A similar situation exists in regard to the materials used in the backing layers. The fibrous laminates traditionally used in the backing layers of ballistic armor structures are not transparent. Traditional backing and fragment catching layers for transparent armor are predominately un-reinforced sheets of polyacrylic or polycarbonate polymer, although some advances have been made in use of optimized copolymer compositions for these layers. Thus, for most transparent armor applications, the chosen solution is the same as that which has been used for decades, a hard face of multiple layers of borosilicate float glass with a backup layer or layers of a polymer sheet to catch fragments, bound together with a conventional transparent adhesive.

Moreover, in several transparent armor applications, there is a need to use transparent armor in an environment in which the transparent armor is subjected to ultraviolet radiation, such as in vehicle windows and the exterior windows of a building. Ultraviolet radiation is harmful to conventional transparent adhesives used to bind a transparent hard face to the backup layer, with prolonged exposure resulting in degradation of the transparent adhesive. Conventional borosilicate float glass and soda lime glass structures are transparent to ultraviolet radiation, thereby allowing ultraviolet radiation to penetrate the hard face and contact the adhesive binding. The ultimate effect is that conventional transparent armor exhibits discoloration and delamination under prolonged exposure to ultraviolet radiation, such as in prolonged outdoor conditions.

There is a further need in several transparent armor applications to use transparent armor in an environment in which the transparent armor is subjected to extremes of temperature, for instance, in desert conditions. In some desert areas, nighttime temperatures can often fall well below freezing, and daytime temperatures inside an enclosed vehicle can exceed 85 degrees Centigrade (185 degrees Fahrenheit). In conventional transparent armor, differences in thermal expansion properties of the various layers of material can lead to delamination of the transparent armor when subjected to extreme changes in temperature.

In light of the above, there is a clear need for improvement in lighter weight, thinner transparent armor to meet the increasing threats posed by newer and more powerful projectiles and more energetic fragments. There is further need for improvement in transparent armor to meet the needs of transparent armor applications in which the armor is exposed to ultraviolet radiation, heat, cold, and other changing weather conditions.

BRIEF SUMMARY OF THE INVENTION

A transparent armor system for limiting the transfer of impact force from a projectile and method of manufacture is disclosed herein. The transparent armor system includes a hard face and a backing covering a rear surface of the hard face opposite an anticipated incoming projectile.

The hard face is defined by a layer fabricated from a glass-ceramic substance having a hardness and compressive strength, both in dynamic conditions and standard temperature and pressure conditions, sufficient to substantially absorb at least a portion of the impact from an incoming projectile. The backing is a layer fabricated from a polymer substantially covering a rear surface of the hard face. The backing is selected to have a sufficient thickness and strength to withstand stresses imparted to the backing under ballistic impact of the hard face. Furthermore, the backing is selected to have a refractive index sufficiently similar to the refractive index of the hard face such that the transparent armor system is substantially transparent.

In one embodiment, at least one reinforcing layer is disposed between the hard face and the backing. The reinforcing layers are each fabricated from a glass-ceramic substance having a hardness and compressive strength sufficient to substantially absorb at least a portion of the impact from an incoming projectile. In another embodiment, a covering is laminated to the front surface of the hard face. The covering is a layer fabricated from a polymer maintaining at least simple intimate contact with the front surface. The covering cooperates with the backing to contain debris resulting from fracture of the hard face. A bonding layer is provided between each of the various reinforcing layers, the hard face, the backing, and the covering, to bond the various layers together.

A method of manufacture of the transparent armor system generally includes providing a hard face and a backing, and substantially covering the rear surface of the hard face with the backing. A bonding layer is provided and arranged in a substantially coplanar fashion between the hard face and the backing. The various layers are then held together in the substantially coplanar configuration while the bonding layer is allowed to join the hard face to the backing.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
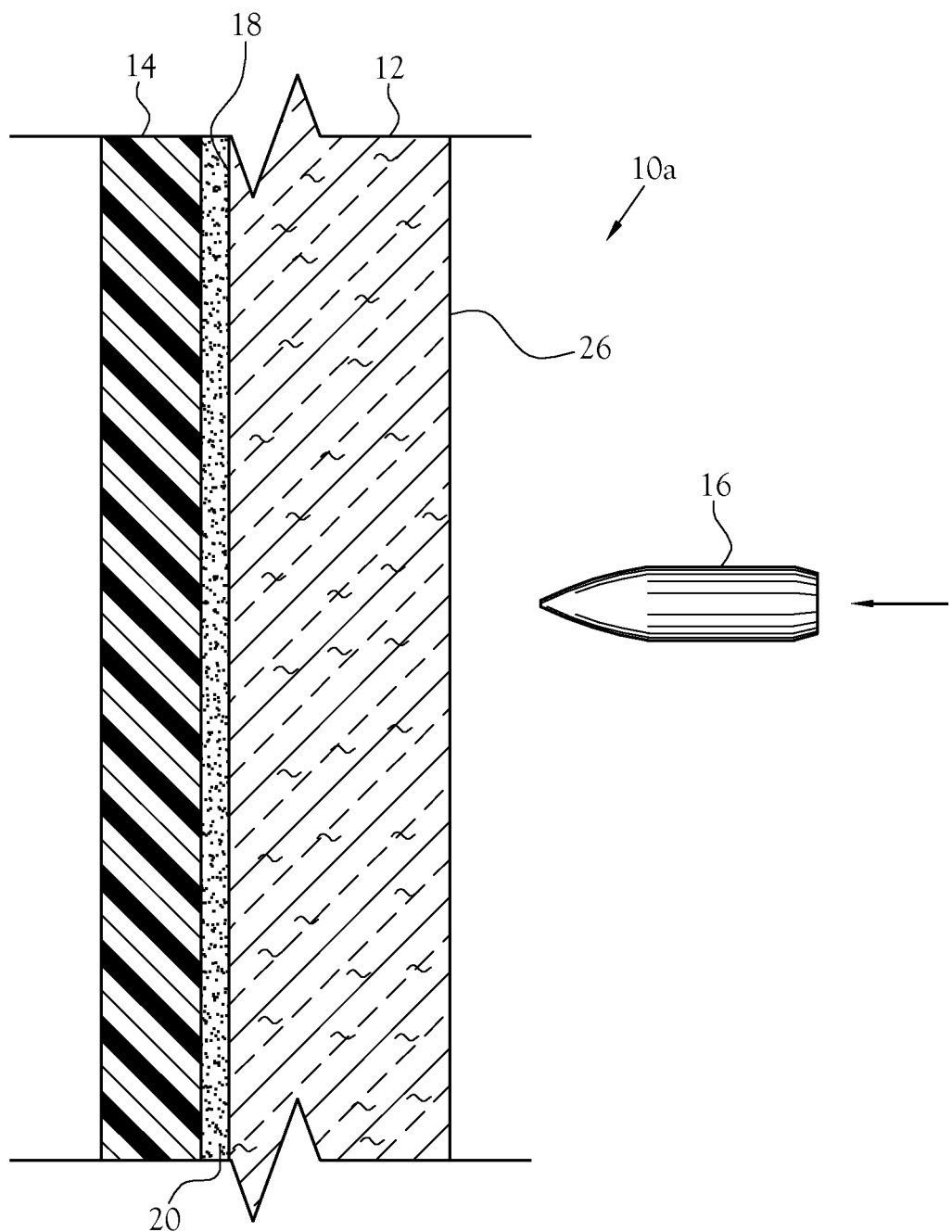
FIG. 1 is a cross-sectional view of one embodiment of the transparent armor system constructed in accordance with several features of the present invention.

A transparent armor system for limiting the transfer of impact force from a projectile and corresponding method of manufacture is disclosed herein. The transparent armor system is illustrated generally at 10 in the figures. With reference to FIG. 1, one embodiment of the transparent armor system 10a includes a hard face 12 and a backing 14 covering a rear surface 18 of the hard face 12 opposite an anticipated incoming projectile 16.

The hard face 12 is defined by a layer fabricated from a glass-ceramic substance having a hardness and compressive strength sufficient to substantially absorb at least a portion of the impact from an incoming projectile 16. The hard face 12 defines a front surface 26 configured to face an incoming projectile 16 and a rear surface 18 configured opposite an incoming projectile 16. It is understood that the specific type of glass-ceramic material suitable for use in the hard face 12 depends upon the mass, velocity, and impact characteristics of the projectile to be armored against. The hard face 12 can vary in thickness, configuration, density, and weight in order to enhance the projectile stopping power.

The glass-ceramic material forming the hard face 12 is generally a material produced by traditional glass making processes, but having been subsequently annealed under specific conditions leading to the nucleation and growth of crystalline bodies throughout the mass of the glass-ceramic material. In one embodiment, the crystalline bodies are composed of a lithium alumino silicate phase which is crystallized during production of the glass-ceramic material. However, those skilled in the art will recognize other materials which may form the crystalline bodies. Increasing the crystallization of the mass of the glass-ceramic material will, as a general rule, enhance its shielding power. It is generally accepted in the art that crystallization of up to about 60-70 percent of the mass of the glass-ceramic material can be accomplished without degradation to the transparent nature of the glass. However, it will be understood that higher crystallization of the mass of the glass-ceramic material may be accomplished without departing from the spirit and scope of the present invention.

It is further accepted in the art that decreasing the average dimensions of the individual crystals within the glass-ceramic crystallization results in a more transparent glass-ceramic material. To this extent, in one embodiment, the hard face 12 is fabricated from a glass-ceramic formed with crystals collectively having an average dimension per crystal of less than approximately two-hundred (200) nanometers. However, crystalline structures exhibiting an average dimension per crystal greater than two-hundred (200) nanometers is contemplated.

It has been found that mechanical properties of glass-ceramic materials at standard temperature and pressure (STP) are dissimilar from the properties of glass-ceramic materials during the very short time intervals of a ballistic event. For instance, plastic compression resulting from ballistic impact often alters the materials properties of glass-ceramic materials during the brief period while ballistic impact occurs. As an example, in one embodiment, the hard face 12 is fabricated from a glass-ceramic material with an approximately 65% by volume non-continuous phase of crystals, each crystal having a dimension of approximately less than 100 nanometers. In this embodiment, the glass-ceramic material offers materials properties during the time period of ballistic impact that are neither anticipated nor predicted by properties of the glass-ceramic material measured under STP. In this embodiment, the continuous glassy phase of the glass-ceramic material, which is a super-cooled liquid, plastically compresses and conforms for a brief time under the pressure of a ballistic impact. This plastic compression brings the crystals into closer proximal location, thus presenting a heightened ballistic resistance exhibited by the temporarily plastically compressed glass-ceramic material.

It will be understood that in selecting the overall thickness of the hard face 12, there is a weight versus effectiveness trade off in certain applications. For example, it is important that armor for personal use be lightweight, while armor for vehicle use or for building use can be of a heavier weight. However, generally the thicker the hard face 12, the more effective the hard face 12 is in disrupting an incoming projectile 16. Also, in deciding the specific properties of glass-ceramic material for use in the hard face 12, hardness relative to the sonic velocity of the incoming projectile 16 may also be an important factor. As such, it is appreciated that the fabrication of the hard face 12 from a glass-ceramic material provides an increased ability of the transparent armor system 10 to disrupt an incoming projectile 16, as compared to a conventional transparent hard face of comparable thickness. Alternatively, such fabrication of the hard face 12 from a glass-ceramic material allows a thinner and therefore more lightweight hard face 12 to provide similar disruption of an incoming projectile 16, as compared to a conventional transparent hard face.

In the illustrated embodiment of FIG. 1, the backing 14 is a layer fabricated from a transparent substance substantially covering the rear surface 18 of the hard face 12 such that the backing 14 maintains at least simple intimate contact with the rear surface 18. In one embodiment, the backing 14 is a polymer material. In another embodiment, the backing 14 is fabricated from tempered glass. Those skilled in the art will recognize other materials suitable for use in fabrication of the backing 14.

Figure 2:
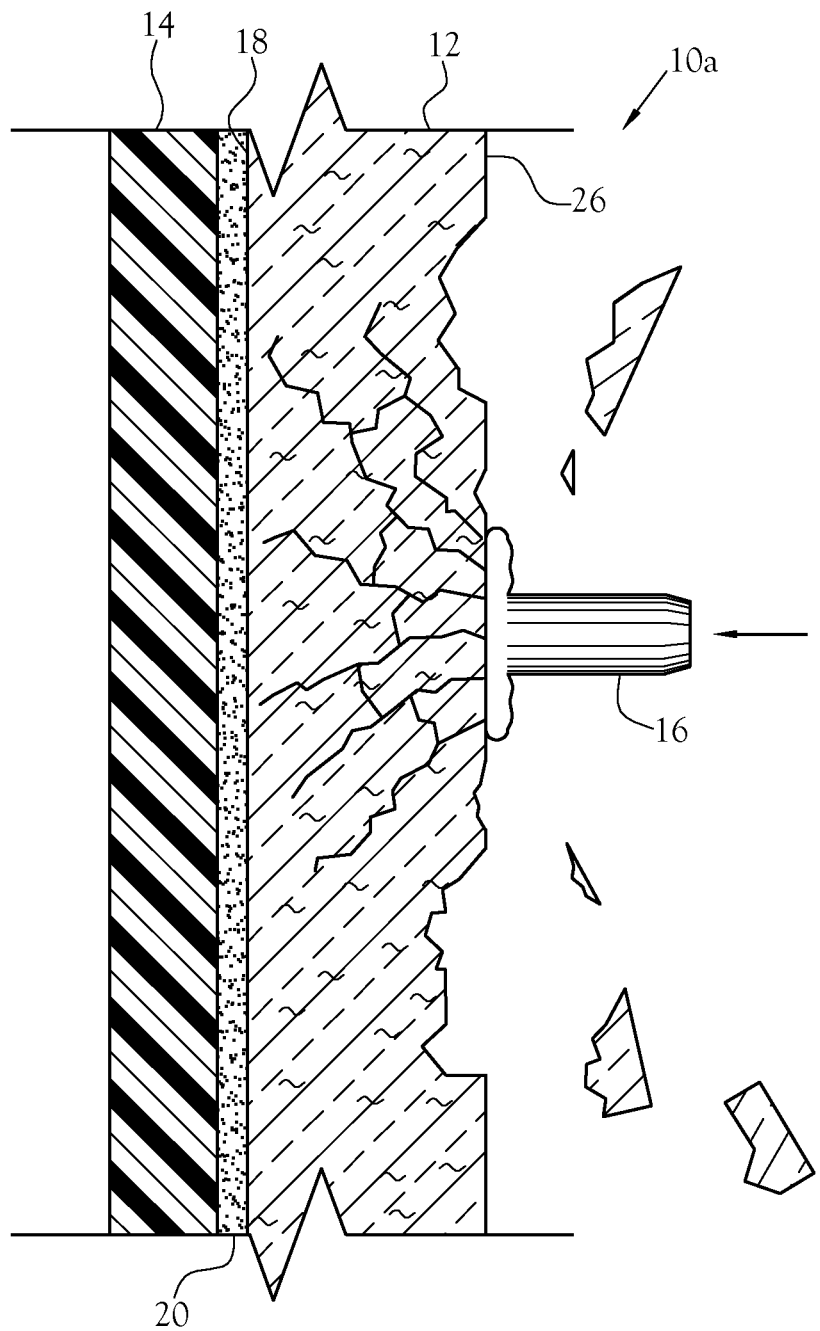
FIG. 2 is a cross-sectional view of the transparent armor system of FIG. 1, showing a projectile impacting the hard face.

As shown in FIG. 2, it is appreciated that, upon subjection of the hard face 12 to forces resulting from impact by an incoming projectile 16, deformation of the hard face 12 as well as fracture of the hard face 12 are each contemplated. Of course, the degree to which the hard face 12 deforms and fractures is relative to the magnitude of the impact forces of the incoming projectile 16. The backing 14 is selected to have a sufficient thickness and strength to withstand stresses imparted to the backing 14 under ballistic impact of the hard face 12. The maximum stress the hard face 12 imparts to the backing 14 is related to the specific yield stress of the hard face 12. Specifically, the higher the yield stress of the hard face 12, the less stress is imparted to the backing 14. Furthermore, the backing 14 is selected to have a refractive index sufficiently similar to the refractive index of the hard face 12 such that the transparent armor system 10 is substantially transparent. In more discreet embodiments, the backing 14 is further selected to be substantially abrasion resistant.

The at least intimate contact between the backing 14 and the hard face 12 provides a means for containing debris resulting from fracture of the hard face 12, such as, for example, fracture resulting from projectile impact. As shown in FIG. 2, such debris containment serves to limit the various fractured pieces of the hard face 12 from propulsion through the backing 14 and toward a target protected by the transparent armor system 10a. Such debris containment further serves to retain such fractured pieces substantially within the original configuration of the hard face 12, thereby improving the multi-hit performance and field durability of the transparent armor system 10a.

A bonding layer 20 is provided to bond the backing 14 to the hard face 12. The bonding layer 20 is defined by a layer of adhesive material disposed between the backing 14 and the hard face 12 which is suitable to bond the backing 14 to the hard face 12 while also filling surface irregularities between the various layers. Such filling of surface irregularities allows the bonding layer 20 to maintain substantially similar refractive indexes between the backing 14, the bonding layer 20, and the hard face 12. The bonding layer 20 thereby promotes transparency of the combined transparent armor system 10. In more discreet embodiments, the bonding layer 20 is fabricated from a material within the family of thermoplastic bonding agents. In even more discreet embodiments, the bonding layer 20 is fabricated from a material selected from the group consisting of polyvinylbutyral (PVB), thermoplastic polyurethanes (TPU), and other such materials. However, those skilled in the art will recognize other materials suitable for fabrication of the bonding layer 20.

It has been found that use of a glass-ceramic material for the hard face 12 containing crystalline structures in the form of a lithium alumino silicate phase results in a glass-ceramic material which substantially absorbs at least a portion of the ultraviolet spectrum. Thus, in an embodiment using such a glass-ceramic material for the hard face 12, the bonding layer 20 is substantially protected from degradation due to exposure to ultraviolet radiation through the hard face 12. Those skilled in the art will recognize that other glass-ceramic materials provide similar ultraviolet radiation protection to the bonding layer 20, and such glass-ceramic materials may be used to fabricate the hard face 12 without departing from the spirit and scope of the present invention.

It has further been found that glass-ceramic material exhibits a relatively low coefficient of thermal expansion, as compared to conventional borosilicate float glass materials. Moreover, in certain more discreet embodiments, the bonding layer 20 is fabricated from a material exhibiting a coefficient of thermal expansion sufficiently low as to exhibit thermal expansion properties comparable to the glass-ceramic material. In other embodiments, the bonding layer 20 is fabricated from a material exhibiting adhesion sufficient to maintain shear compliance between the hard face 12 and the backing 14 while the transparent armor system 10a undergoes thermal expansion due to changes in temperature of the transparent armor system 10a ranging from below freezing to over 85 degrees Centigrade. Those skilled in the art will recognize materials suitable to achieve such shear compliance between the hard face 12 and the backing 14.

Figure 3:
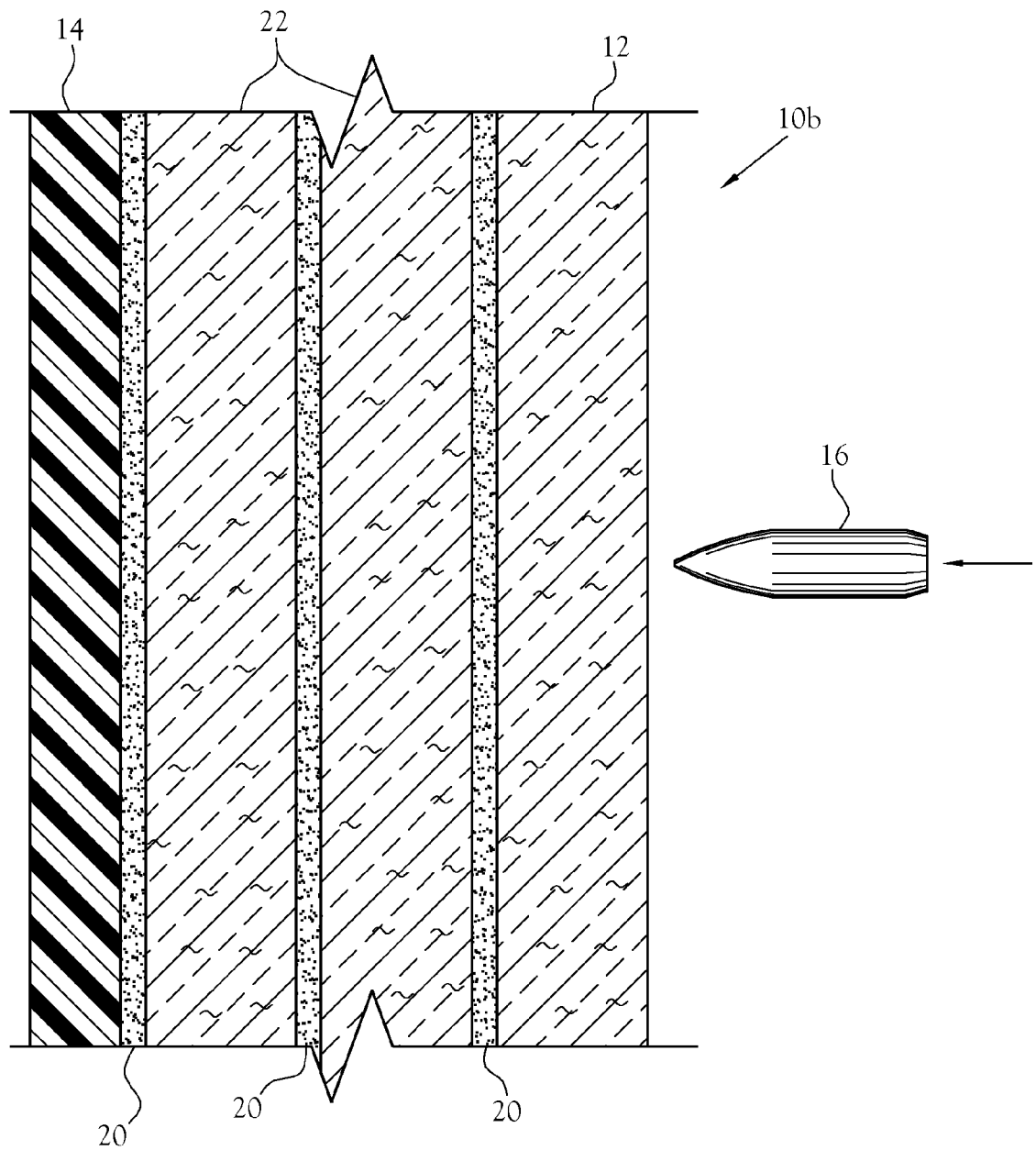
FIG. 3 is a cross-sectional view of another embodiment of the transparent armor system, in which two reinforcing layers are included.

FIG. 3 illustrates another embodiment of the transparent armor system 10b of the present invention. In the embodiment of FIG. 3, at least one reinforcing layer 22 is disposed between the hard face 12 and the backing 14. Similarly to the hard face 12, the reinforcing layers 22 are each fabricated from a glass-ceramic substance having a hardness and compressive strength sufficient to substantially absorb at least a portion of the impact from an incoming projectile 16. An additional bonding layer 20 is provided between each reinforcing layer 22, between the reinforcing layers 22 and the hard face 12, and between the reinforcing layers 22 and the backing 14.

Figure 4:
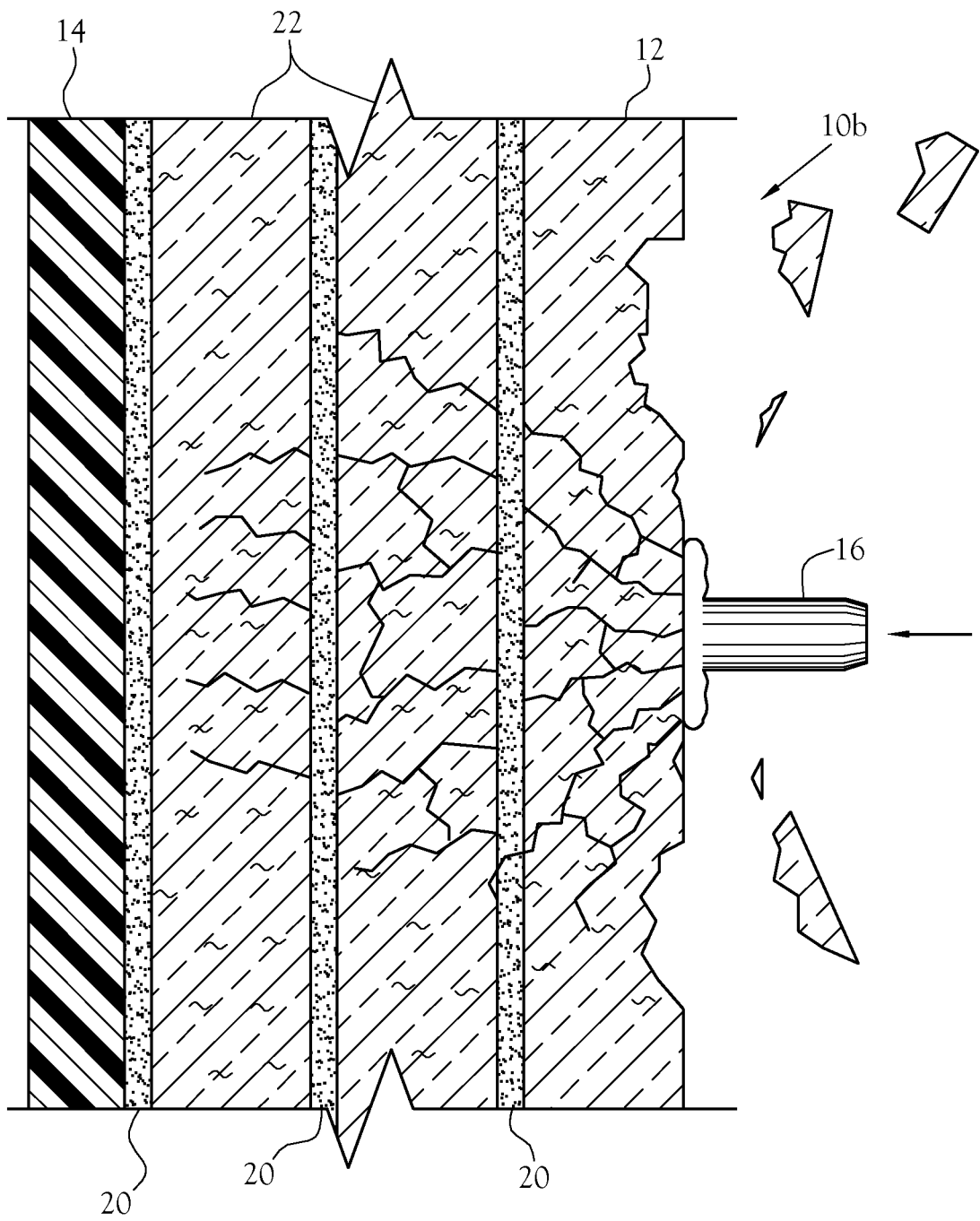
FIG. 4 is a cross-sectional view of the transparent armor system of FIG. 3, showing a projectile impacting the hard face.

FIG. 4 illustrates a projectile 16 impacting the embodiment of the transparent armor system 10b of FIG. 3. As shown in FIG. 4, the reinforcing layers 22 serve to provide structural stability to the transparent armor system 10b and to further absorb energy transferred to the reinforcing layers 22 from the hard face 12 during structural failure of the hard face 12 resulting from ballistic impact. Each subsequent reinforcing layer 22 opposite the hard face 12 from the projectile 16 further absorbs energy transferred from the previous layer. In this configuration, the amount of fracture, deformation, and other damage done to each successive layer 12, 22 decreases as the impact of the projectile 16 moves through the transparent armor system 10b. Furthermore, each reinforcing layer 22 provides a means for containing debris resulting from fracture of the previous layer, such as, for example, fracture resulting from projectile impact.

In the illustrated embodiment of FIGS. 3 and 4, two reinforcing layers 22 with cooperating bonding layers 20 are provided. However, it will be understood that any number of reinforcing layers 22 with cooperating bonding layers 20 may be provided without departing from the spirit and scope of the present invention. Furthermore, it will be understood that the provision of a reinforcing layer 22 is not necessary to accomplish the present invention.

Figure 5:
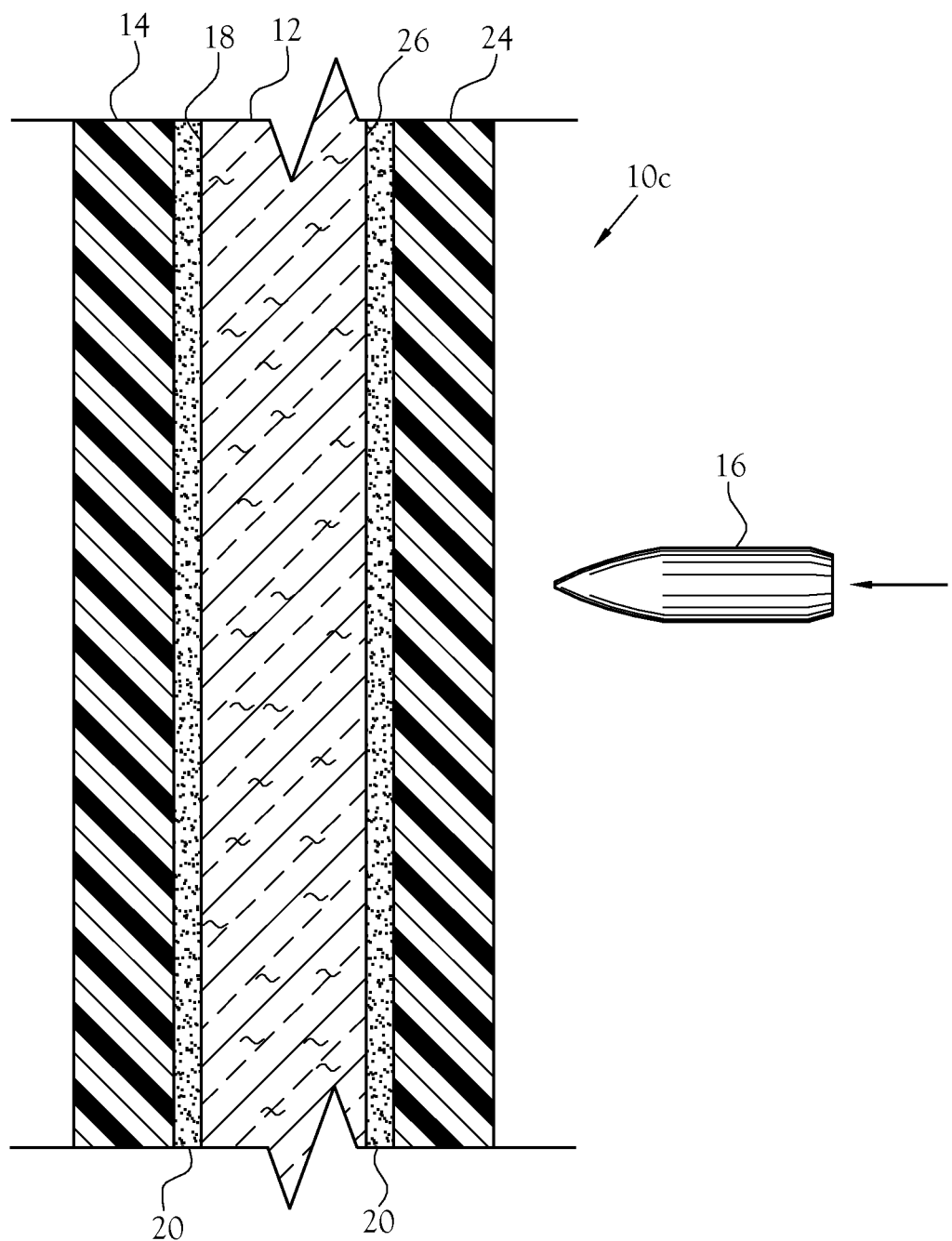
FIG. 5 is a cross-sectional view of another embodiment of the transparent armor system, in which the covering is included.

FIG. 5 illustrates another embodiment of the transparent armor system 10c. In the embodiment of FIG. 5, a covering 24 is laminated to the front surface 26 of the hard face 12. The covering 24 is a layer fabricated from a transparent material maintaining at least simple intimate contact with the front surface 26. In one embodiment, the covering 24 is fabricated from a polymer material. In another embodiment, the covering 24 is fabricated from a glass material. Those skilled in the art will recognize other materials suitable for use in fabrication of the covering 24.

The covering 24 cooperates with the backing 14 to contain debris resulting from fracture of the hard face 12. In several embodiments incorporating a covering 24, an additional bonding layer 20 is provided between the hard face 12 and the covering 24 to secure the covering 24 to the front surface 26. In more discreet embodiments, the covering 24 is selected to provide surface protective features, such as abrasion resistance, chemical corrosiveness resistance, and other surface protection features to the transparent armor system 10. For example, in one embodiment, the covering 24 is selected from a substantially scratch-resistant material, such as polycarbonate, thereby serving to protect the hard face 12 from scratches and blemishes resulting from day to day use. Furthermore, use of polycarbonate in fabrication of the covering 24 results in a covering 24 which is also an absorber of ultraviolet radiation, thereby further protecting the various bonding layers 20 from degradation due to ultraviolet radiation exposure in outdoor transparent armor applications. Those skilled in the art will recognize other suitable materials for use in fabrication of the covering 24. In one embodiment, multiple coverings 24 are provided. In this embodiment, one covering 24 provides an abrasive resistance feature to the transparent armor system 10, while another covering 24 provides a chemical resistance feature. It will be understood that other suitable configurations for multiple coverings 24 are contemplated.

Figure 6:
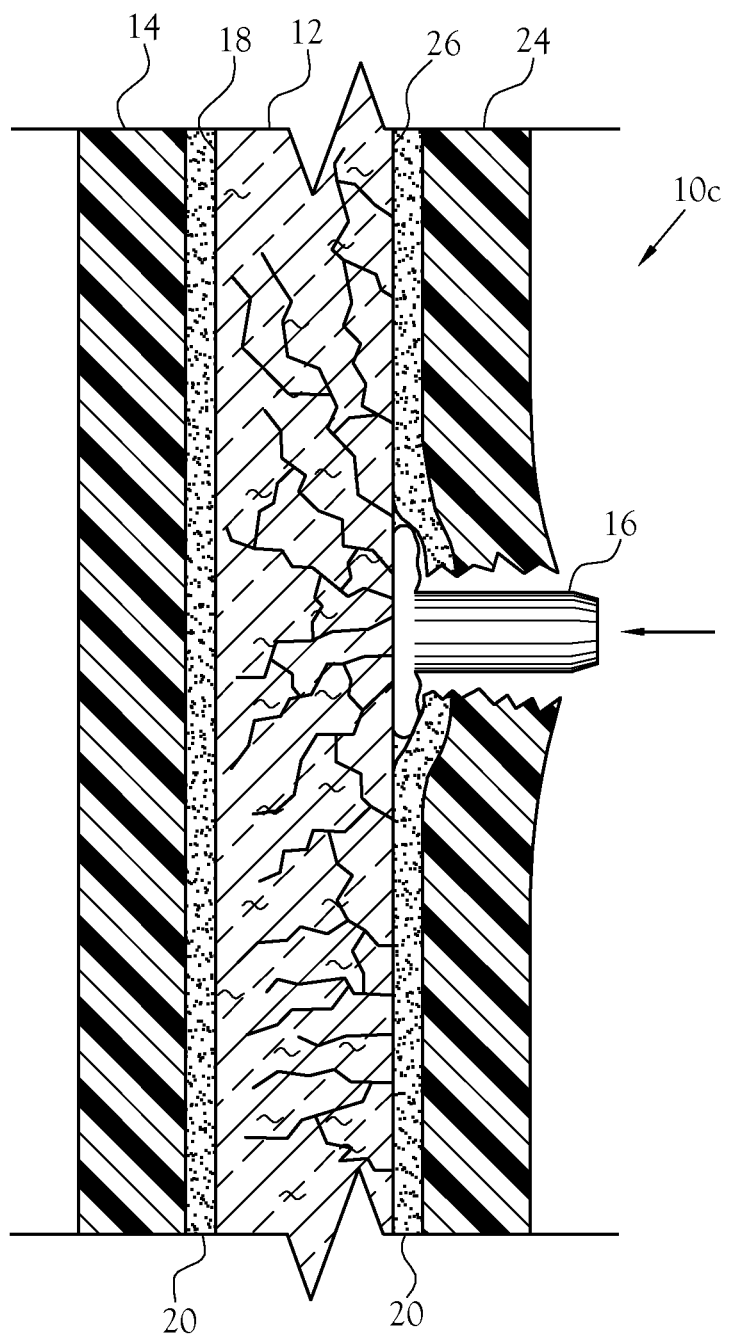
FIG. 6 is a cross-sectional view of the transparent armor system of FIG. 5, showing a projectile piercing the covering and impacting the hard face.

FIG. 6 shows an incoming projectile 16 impacting the embodiment of the transparent armor system 10c of FIG. 5. In the present embodiment, the covering 24 is selected to have a sufficient thickness and strength to contain debris resulting from fracture of the hard face 12, such as, for example, fracture resulting from projectile impact. As shown in FIG. 6, upon impact of the transparent armor system 10c by the incoming projectile 16, the incoming projectile 16 pierces the covering 24 and impacts the hard face 12. Upon subjection of the hard face 12 to forces resulting from impact by the incoming projectile 16, deformation of the hard face 12 as well as fracture of the hard face 12 is contemplated. Thus, in the embodiment of FIG. 6, the covering 24 cooperates with the backing 14 to further retain the various fractured pieces of the hard face 12 substantially within the original configuration of the hard face 12, thereby further improving the multi-hit performance and field durability of the transparent armor system 10.

In certain more discreet embodiments, the covering 24 and the backing 14 are each selected to be in tension against the hard face 12 and reinforcing layers 22. Such tension is accomplished, for example, by selecting the covering 24 and the backing 14 to each having coefficients of thermal expansion greater than the hard face 12. It is understood in the art that the coefficient of thermal expansion of most glass-ceramic materials is equal to or near zero in temperatures ranging from −40 to 85 degrees Centigrade. In this embodiment, the covering 24 and backing 14 are applied to the hard face 12 and reinforcing layers 22 at an elevated temperature, and thereafter allowed to cool such as to place the covering 24 and the backing 14 in tension against the hard face 12 and reinforcing layers 22. In this configuration, the covering 24 cooperates with the backing 14 to place the hard face 12 and reinforcing layers 22 into compression, thereby improving the composite strength of the transparent armor system 10c. Such compression further serves to secure various fractured pieces of the hard face 12 substantially within the original configuration of the hard face 12.

Figure 7:
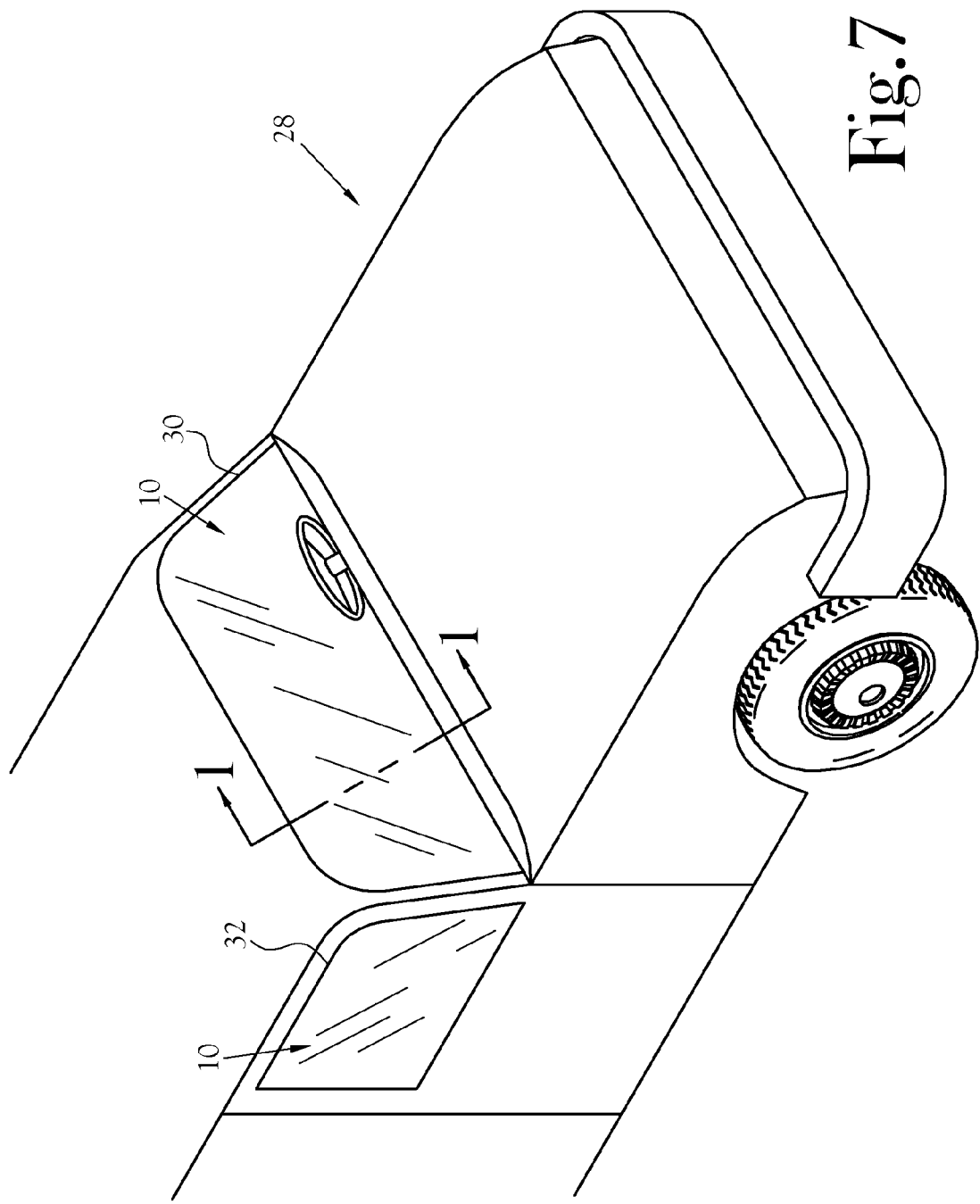
FIG. 7 is a partial perspective view of an armored vehicle having a windshield and windows fabricated from the transparent armor system.

FIG. 7 pertains to one possible application of the transparent armor system 10 of the present invention. FIG. 7 shows an armored vehicle 28 utilizing a windshield 30 and windows 32 fabricated from panels of the transparent armor system 10. Various body surfaces of the armored vehicle 28 are fabricated from opaque ballistic armor structures. In this application, the windshield 30 and windows 32 fabricated from the transparent armor system 10 serve to provide protection from ballistic projectiles aimed toward the vehicle interior through the windshield 30 and windows 32 of the vehicle 28. In this way, the various panels of the transparent armor system 10 cooperate with the opaque ballistic armor structures of the armored vehicle body to form a substantially encapsulated ballistic armored shelter within the interior of the armored vehicle 28.

While the application of FIG. 7 utilizes a windshield 30 and windows 32 that are substantially planar, it will be understood by one skilled in the art that the transparent armor system 10 can be constructed to resemble numerous surface shapes, as well as numerous three-dimensional shapes. As such, it is not the intention of the applicant to restrict or in any way limit the scope of the appended claims to any specific overall shape of the transparent armor system 10. To this extent, structural shapes utilizing a hard face 12 core substantially surrounded by an integral backing 14 and covering 24 are contemplated.

FIGS. 8-11 pertain to a method of manufacture of the transparent armor system 10, also disclosed herein. As is further discussed below, the method of manufacture generally includes providing a hard face 12 and a backing 14, and substantially covering the rear surface 18 of the hard face 12 with the backing. A bonding layer 20 is provided and arranged in a substantially coplanar fashion between the hard face 12 and the backing 14. The various layers 12, 14, 20 are then held together in the substantially coplanar configuration while the bonding layer 20 is allowed to join the hard face 12 to the backing 14.

Figure 8:
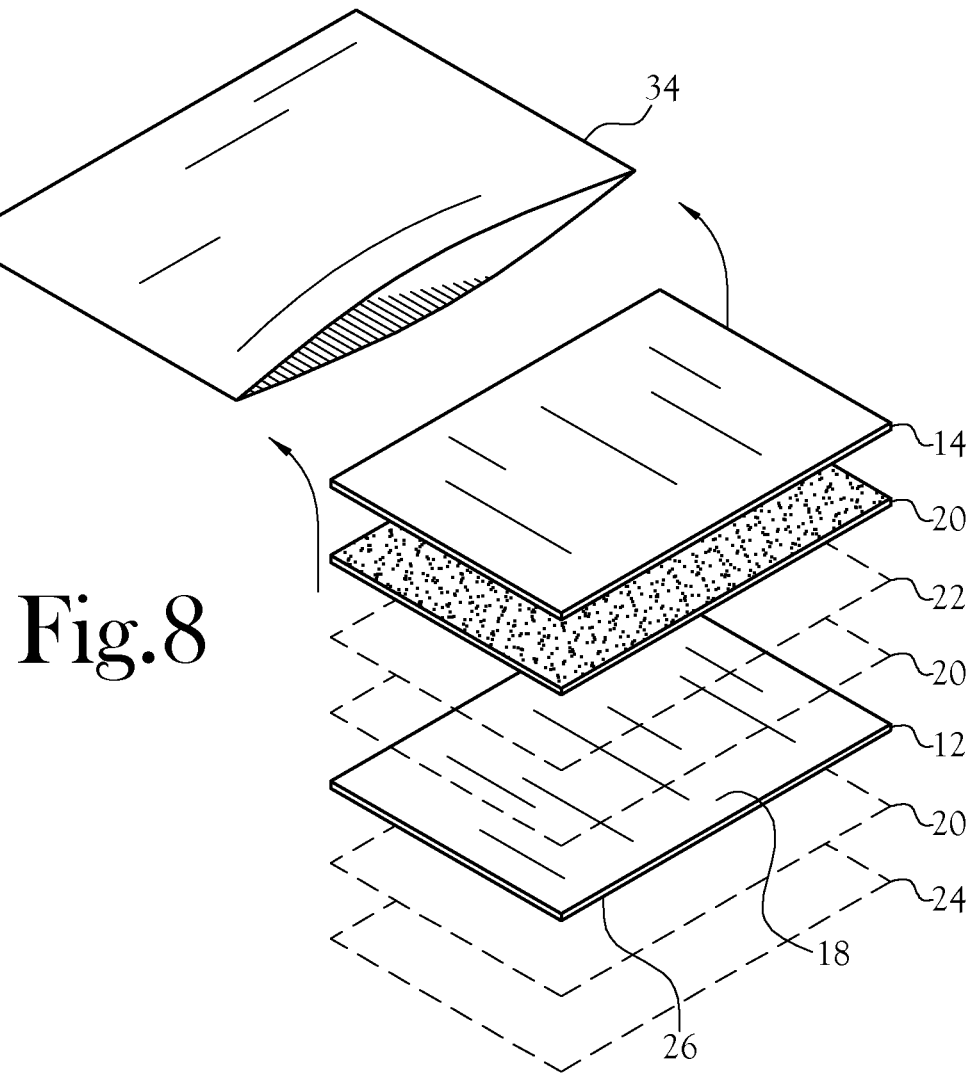
FIG. 8 is an exploded perspective view of various layers used to manufacture one embodiment of the transparent armor system, together with a substantially airtight container.
Figure 9:
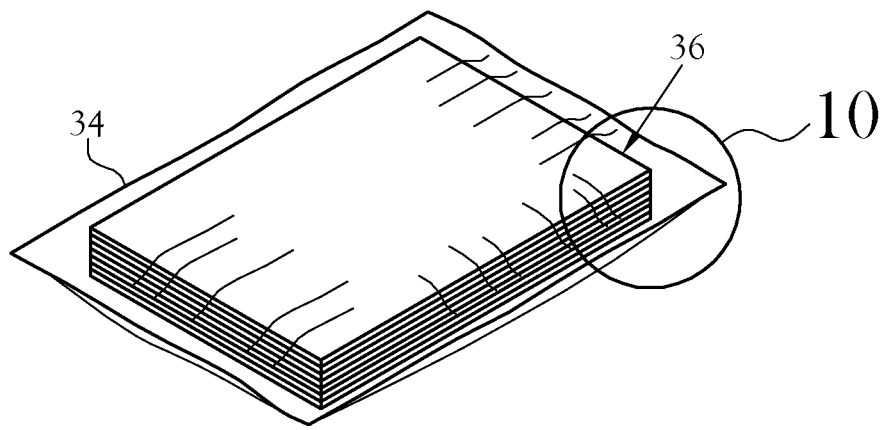
FIG. 9 is a perspective view of the materials of FIG. 8, showing the substantially airtight container containing the laminate structure, with the airtight container sealed and evacuated.
Figure 10:
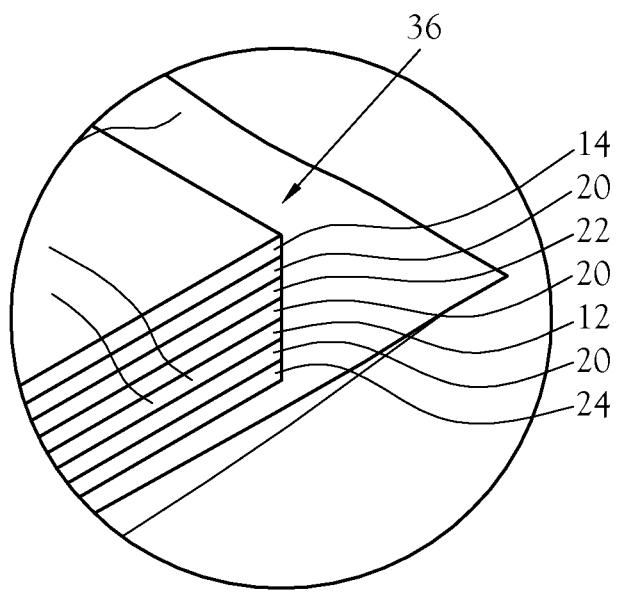
FIG. 10 is a perspective view showing one corner of the substantially airtight container of FIG. 9.

In the embodiment of the method illustrated in FIGS. 8-10, a substantially compliant and substantially airtight container 34 is provided to hold the various layers in the substantially coplanar configuration. The container 34 is of approximate dimensions and volume to contain a panel fabricated from the transparent armor system 10. Referring to FIG. 8, a hard face 12 and a backing 14 are each provided. Optionally, a selected number of reinforcing layers 22 sufficient to allow the finished panel to accomplish the ballistic stopping ability required for the particular application are also provided. As well, a sufficient number of bonding layers 20 are provided to bond the hard face 12, backing 14, and each reinforcing layer 22 together. Optionally, a covering 24 is provided, together with an additional bonding layer 20 to bond the covering 24 to the front surface 26 of the hard face 12.

As shown in FIG. 9, the various layers of materials are stacked in a substantially coplanar fashion. The covering 24 (if any) and the backing 14 are arranged on opposing sides of the hard face 12, with any reinforcing layers 22 arranged between the backing 14 and the hard face 12, and at least one bonding layer 20 separating each successive layer. Referring to FIG. 10, the hard face 12, the reinforcing layers 22, the bonding layers 20, the backing 14, and any covering 24 cooperate to define a laminate structure 36.

Figure 11:
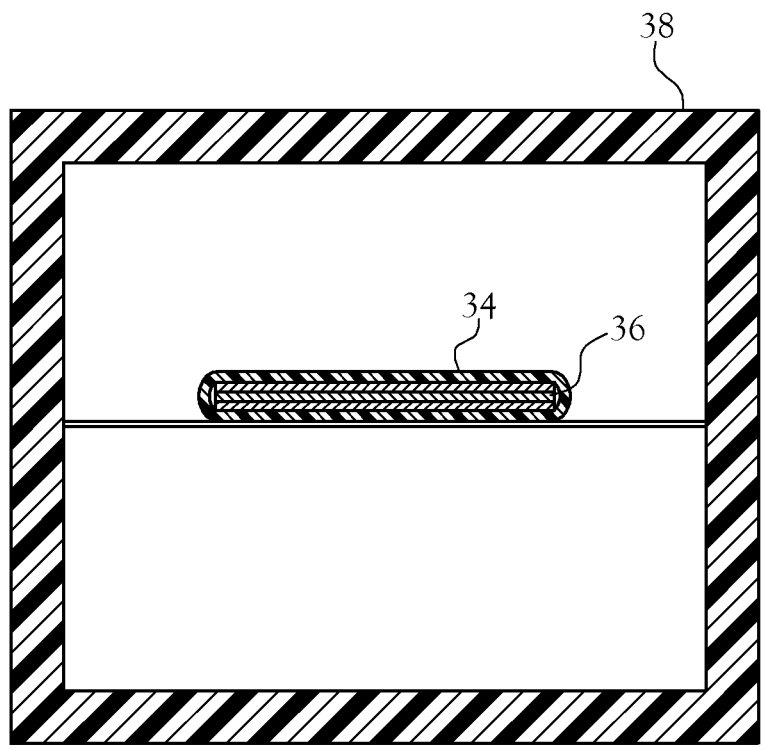
FIG. 11 is a cross-sectional view of a vessel containing the sealed and evacuated container of FIG. 9.

Referring again to FIG. 9, the laminate structure 36 is placed within the container 34. The container 34 is then sealed and evacuated to a low pressure, thereby forcing the various components of the laminate structure 36 into close proximity. As shown in FIG. 11, while still evacuated, the container 34 containing the laminate structure 36 is placed into a vessel 38. The vessel 38 is then heated, such that the laminate structure 36 is heated to a temperature in which the bonding layers 20 are softened and become adhesive. In more discreet embodiments, the bonding layers 20 are heated to the point of forming a liquid interface between the various layers of the laminate structure 36. The liquid interface is then capable of substantially filling any surface optical defects on the various layers of the laminate structure 36 that would otherwise interfere with the overall transparency of the laminate structure 36.

Gaseous pressure is thereafter applied inside the vessel 38, exterior to the container 34. The combination of temperature of the bonding layers 20 and pressure within the vessel 38 is maintained for a sufficient time as to allow a desirable amount of bonding within the laminate structure 36, as well as any filling of surface optical defects throughout the laminate structure 36. In one embodiment, bonding within the laminate structure 36 is continued until such point that temperature reduction of the laminate structure 36 absent excessive deleterious residual stresses within the laminate structure 36 is possible. When a desirable amount of bonding within the laminate structure 36 has been reached, the temperature of the laminate structure 36 is reduced, such as to firmly set the bonding layers 20, thereby forming a finished transparent armor system 10. The pressure in the vessel 38 and the vacuum in the container are then released, and the finished transparent armor system 10 is removed.

From the foregoing description, it will be understood that a transparent armor system 10 and method of manufacture has been provided. The transparent armor system provides a transparent ballistic armor structure which is capable of providing ballistic protection comparable to conventional transparent armor structures, but with reduced aerial weight as compared to the conventional transparent armor structures. The transparent armor system provides a laminate structure exhibiting optical transmission, relatively low scattering, cohesive interlaminar strength, scratch and abrasion resistance, multi-hit capability, thermal environment stability, and light weight.

Furthermore, the transparent armor system provides a transparent ballistic armor structure which is capable of providing increased ballistic protection compared to a conventional transparent armor structure of similar aerial weight. The transparent armor system offers a heightened protection against fragmentation ballistics. For example, one embodiment of the transparent armor system has been shown to stand up to the equivalent of twin 155 improvised explosive devices at three meters from the explosives. In this experiment, the rate of travel of the fragmentation ballistic projectiles was inferred to be greater than 3,000 feet per second. It is anticipated that the interlaminate layering of the transparent armor system promotes shock wave propagation delay, allowing the preservation of hard face material from damage from the shock wave often preceding an incoming projectile. Such shock wave propagation delay serves to preserve the hard face, allowing the incoming projectile to be met with an undamaged hard face.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. An armor system for opposing an incoming projectile, said armor system comprising:
    two overlapping glass-ceramic layers, each of said glass-ceramic layers defining a front surface and a rear surface, each of said glass-ceramic layers defining a plurality of surface irregularities along at least one of said front and rear surfaces, each of said glass-ceramic layers being fabricated from a glass-ceramic material having a crystal phase distributed throughout the mass of the glass-ceramic material and exhibiting between 60 and 70 percent crystalline bodies by mass of the glass-ceramic material, said glass-ceramic material having a refractive index, said glass-ceramic material exhibiting a coefficient of thermal expansion lower than the coefficient of thermal expansion of borosilicate glass;

a bonding layer between said glass-ceramic layers and bonded to said glass-ceramic layers to join said glass-ceramic layers in said overlapping configuration, said bonding layer having a refractive index substantially matching said refractive index of said glass-ceramic layers to allow substantial transparency of said armor system to visible light;

a backing layer substantially covering said rear surface of a first of said glass-ceramic layers; and a covering layer substantially covering a front surface of a second of said glass-ceramic layers, said covering layer having a refractive index substantially matching said refractive index of said glass-ceramic layers to allow substantial transparency of said armor system to visible light, and wherein said backing layer and said covering layer compress said first glass-ceramic layer and said second glass-ceramic, respectively.

2. The armor system of claim 1, said backing layer comprising a polymeric sheet having sufficient strength and thickness to substantially withstand stresses imparted to said backing layer during ballistic impact of said front surface.

3. The armor system of claim 1, said bonding layer comprising a thermoplastic bonding agent.

4. The armor system of claim 3, said bonding layer being selected from the group consisting of polyvinylbutyral (PVB), and thermoplastic polyurethanes (TPU).

5. The armor system of claim 1, said covering layer comprising a polymeric sheet having sufficient strength and thickness to cooperate with said backing layer to substantially contain said glass-ceramic layers between said covering layer and said backing layer due to fracture of said glass-ceramic layers during ballistic impact of said front surface.

6. The armor system of claim 1, further comprising a second bonding layer between said covering layer and said front surface of one of said glass-ceramic layers, said second bonding layer configured to join said covering layer to said glass-ceramic layer.

7. The armor system of claim 6, wherein said second bonding layer is selected to substantially match said refractive indexes of said covering layer and said glass-ceramic layer to maintain substantial transparency to visible light between said covering layer and said glass-ceramic layer.

8. The armor system of claim 6, said second bonding layer being selected from the group consisting of polyvinylbutyral (PVB), and thermoplastic polyurethanes (TPU).

9. The armor system of claim 1, wherein each of said bonding layer and said backing layer is joined to a cooperating glass-ceramic layer so as to substantially fill at least a portion of said surface irregularities along said adjacent surface of said cooperating glass-ceramic layer to allow substantial transparency of said armor system to visible light.

10. An armor system for opposing an incoming projectile, said armor system comprising:

a hard face layer defining a front surface and a rear surface;

a reinforcing layer defining a front surface and a rear surface and overlapping said hard face layer, said hard face layer and said reinforcing layer being fabricated from a glass-ceramic material having a crystal phase distributed throughout the mass of the glass-ceramic material and exhibiting between 60 and 70 percent crystalline bodies by mass of the glass-ceramic material, wherein the glass-ceramic material has surface irregularities, said glass-ceramic material having a refractive index and exhibiting a coefficient of thermal expansion lower than the coefficient of thermal expansion of borosilicate glass;

a backing layer substantially overlapping said rear surface of said reinforcing layer;

a bonding layer between said hard face layer and said reinforcing layer, said bonding layer bonding said rear surface of said hard face layer to said front surface of said reinforcing layer in said overlapping configuration, said bonding layer having a refractive index substantially matching said refractive index of said glass-ceramic material and said bonding layer being joined to said reinforcing layer so as to substantially fill said surface irregularities of said glass-ceramic material to allow substantial transparency of said armor system to visible light; and a polymeric covering layer substantially overlapping said front surface of said hard face layer, wherein said backing layer and said covering layer compress said reinforcing layer and said hard face layer, respectively.

11. The armor system of claim 10, said reinforcing layer comprising a plurality of overlapping reinforcing layers, and wherein the armor system further comprises a plurality of bonding layers, wherein there is a boding layer between said hard face layer and a first of said plurality of reinforcing layers, and between each of said plurality of reinforcing layers.

12. The armor system of claim 10, wherein said crystallized lithium alumino silicate phase collectively exhibits an average dimension per crystal of less than approximately one hundred (100) nanometers.

13. The armor system of claim 10, wherein said backing layer has a refractive index sufficiently similar to said refractive index of said glass-ceramic material and said refractive index of said bonding layer so as to allow substantial transparency of said armor system to visible light.

14. A transparent armor system for opposing an incoming projectile, the armor system comprising:

a thermoplastic backing layer having a backing refractive index;

a first glass-ceramic layer;

a second glass-ceramic layer;

a third glass-ceramic layer, said first, second and third glass-ceramic layers each comprising between 60 and 70 percent by mass of a crystal phase and having a glass-ceramic refractive index;

a polymeric covering layer having a covering refractive index;

a first bonding layer bonding said first and second glass-ceramic layers to one another;

a second bonding layer bonding said second and third glass-ceramic layers to one another; and a third bonding layer bonding said third glass-ceramic layer and said thermoplastic backing layer to one another, said first, second, and third bonding layers comprising a material selected from the group consisting of polyvinyl butyral, thermoplastic polyurethane, and a combination thereof, and having a bonding refractive index, wherein said bonding refractive index, said glass-ceramic refractive index, said backing refractive index, and said covering refractive index substantially match one another and said first, second, and third bonding layers are suitable to substantially fill surface irregularities of said thermoplastic backing layer and said first, second, and third glass-ceramic layers, respectively, such that the armor system is substantially transparent to visible light and wherein said backing layer and said covering layer compress said first glass-ceramic layer and said third-glass-ceramic layer, respectively.

* * * * *